US011719293B2

(12) United States Patent
Deckmyn et al.

(10) Patent No.: US 11,719,293 B2
(45) Date of Patent: Aug. 8, 2023

(54) DIAGNOSTIC AND CONTROL METHOD FOR CLUTCHES IN A VEHICLE SYSTEM

(71) Applicant: Dana Automotive Systems Group, LLC, Maumee, OH (US)

(72) Inventors: Peter Deckmyn, Koekelare (BE); Christophe De Buyser, Veldegem (BE); Kris Vanstechelman, Bruges (BE)

(73) Assignee: Dana Automotive Systems Group, LLC, Maumee, OH (US)

(*) Notice: Subject to any disclaimer, the term of this patent is extended or adjusted under 35 U.S.C. 154(b) by 58 days.

(21) Appl. No.: 17/457,234

(22) Filed: Dec. 1, 2021

(65) Prior Publication Data

US 2023/0167862 A1 Jun. 1, 2023

(51) Int. Cl.
*F16D 48/10* (2006.01)
*F16H 61/12* (2010.01)
*F16H 57/00* (2012.01)
*F16H 57/01* (2012.01)
*F16H 61/16* (2006.01)

(52) U.S. Cl.
CPC ...... *F16D 48/10* (2013.01); *F16D 2500/3022* (2013.01); *F16D 2500/3024* (2013.01); *F16D 2500/30401* (2013.01); *F16D 2500/30806* (2013.01); *F16D 2500/3108* (2013.01); *F16D 2500/5012* (2013.01); *F16D 2500/5102* (2013.01); *F16D 2500/70406* (2013.01); *F16D 2500/7105* (2013.01); *F16H 61/12* (2013.01); *F16H 2057/0081* (2013.01); *F16H 2057/018* (2013.01); *F16H 2061/168* (2013.01)

(58) Field of Classification Search
None
See application file for complete search history.

(56) References Cited

U.S. PATENT DOCUMENTS

| 5,209,141 | A  | * | 5/1993  | Asayama ............... F16H 61/12 477/121 |
| 7,980,981 | B2 |   | 7/2011  | Kawaguchi et al. |
| 8,562,485 | B2 |   | 10/2013 | Jung et al. |
| 8,762,015 | B2 | * | 6/2014  | Takada .................... F16H 61/12 701/55 |
| 9,108,614 | B2 |   | 8/2015  | Doering et al. |
| 9,506,560 | B2 | * | 11/2016 | Tachibanada ........... F16H 61/12 |

(Continued)

FOREIGN PATENT DOCUMENTS

| EP | 1607650 A1 | 12/2005 |
| GB | 2302927 A * | 2/1997 ............ B60W 10/02 |

*Primary Examiner* — Timothy Hannon
(74) *Attorney, Agent, or Firm* — McCoy Russell LLP (57) ABSTRACT

Methods and systems are provided for controlling and diagnosing one or more clutches in a transmission. In one example, a method for operation of a vehicle system is provided that includes at a diagnostic controller or processing unit independent from a driveline controller or processing unit, respectively, determining an engagement state of a clutch in a transmission of the vehicle system, wherein the engagement state is selected from a group of three or more clutch engagement states. The method further includes identifying an unauthorized clutch state based on the engagement state of the clutch and a speed of the vehicle and responsive to the identification of the unauthorized clutch state, operating the vehicle system in a fault state.

20 Claims, 4 Drawing Sheets (56) References Cited

U.S. PATENT DOCUMENTS

2002/0035015 A1* 3/2002 Eich ................... B60W 10/02
  477/175
2020/0247195 A1   8/2020 Kona et al.

* cited by examiner

| Operating Gear/Shift Event | Low Clutch (208) | High Clutch (210) | 1st Clutch (212) | 2nd Clutch (214) |
|---|---|---|---|---|
| 1st | High | Low | High | Low |
| Shift (1st to 2nd) | High | Low | Mid | Mid |
| 2nd | High | Low | Low | High |
| Shift (2nd to 3rd) | Mid | Mid | Mid | Mid |
| 3rd | Low | High | High | Low |
| Shift (3rd to 4th) | Low | High | Mid | Mid |
| 4th | Low | High | Low | High |

| Vehicle Speed > | Low Clutch (208) | High Clutch (210) | 1st Clutch (212) | 2nd Clutch (214) | Tolerant time (ms) |
|---|---|---|---|---|---|
| Max speed 1st gear | High | | High | | 100 |
| Max speed 1st gear | Mid or High | | Mid or High | | 500-1000 |
| Max speed 2nd gear | High | | | High | 100 |
| Max speed 2nd gear | Mid or High | | | Mid or High | 500-1000 |
| Max speed 3rd gear | | High | High | | 100 |
| Max speed 3rd gear | | High | Mid or High | Mid or High | 500-1000 |

| Vehicle Speed > | Forward Clutch (218) | Reverse Clutch (216) | Tolerant time (ms) |
|---|---|---|---|
| Max speed reverse gear | | Mid | 100 |
| Max speed forward gear | Mid | | 100 |

| Low Clutch (208) / High Clutch (210) | High | Mid | Low |
|---|---|---|---|
| High | Fault state (Short FTT) | Fault state | Ok |
| Mid | Fault state | Shift (Ok) | Ok |
| Low | Ok | Ok | Ok |
| 1st Clutch (210) / 2nd Clutch (212) | High | Mid | Low |
| High | Fault state (Short FTT) | Fault state | Ok |
| Mid | Fault state | Shift (Ok) | Ok |
| Low | Ok | Ok | Ok |
| Forward Clutch (218) / Reverse Clutch (216) | High | Mid | Low |
| High | Fault state (Short FTT) | Fault state (Short FTT) | Ok |
| Mid | Fault state (Short FTT) | Fault state (Short FTT) | Ok |
| Low | Ok | Ok | Ok |

DIAGNOSTIC AND CONTROL METHOD FOR CLUTCHES IN A VEHICLE SYSTEM

TECHNICAL FIELD

The present description relates generally to control and diagnostic strategies in a vehicle system. More particularly, the present description relates to techniques for fault monitoring in a driveline system.

BACKGROUND AND SUMMARY

Different sets of vehicle driveline conditions may lead to unintended behaviors. The unintended behaviors may include unwanted changes in vehicle kinematic behavior. For instance, a number of conditions may cause erroneous clutch settings that may lead to unwanted vehicle kinematic behaviors. In an attempt to avoid these unwanted behaviors, previous vehicle control and diagnostic systems have guarded against unintended behaviors by verifying actual settings against requested settings. When a mismatch between the requested and actual settings is detected, actions are taken to discontinue the unintended behaviors.

U.S. Pat. No. 7,980,981 B2 to Kawaguchi et al. discloses a vehicle system with an automatic transmission that includes multiple clutches and brakes designed to change the transmission's gear ratio. The system determines whether or not one of the clutches is brought into unintended engagement through the analyzation of vehicle deceleration, an intended gear ratio, and an actual gear ratio.

The inventors have recognized several drawbacks with the systems and methods disclosed by Kawaguchi and other diagnostic systems. For instance, diagnostic strategies which rely on comparison of actual vs. intended gear ratios are processing intensive strategies that may lead to the incorrect identification of an undesired state, in certain situations. This superfluous identification of an undesired state may restrict vehicle performance and lead to unnecessary servicing of the vehicle, in some cases. Further, Kawaguchi's diagnostic logic is provided in a single engine control unit responsible for component control operations and diagnostics in the vehicle system. This may involve complex processing strategies that may pose efficacy issues, under certain conditions, due to the misdiagnoses of an undesired state, described above. Additionally, using a single controller for both diagnostic and control operations may be inflexible and inefficient with regard to altering or updating routines of either operation. Further, other prior diagnostic strategies have involved complex systems that use a comparatively large number of inputs and guard against a large number of unwanted settings in the software, hydraulics, and other systems. As such, previous diagnostic strategies may demand a large amount of processing resources to implement, and therefore may decrease the system's processing efficiency. Furthermore, certain previous diagnostic systems have had difficulties determining actual and intended clutch settings during shifting transients, in some scenarios.

To overcome at least a portion of the aforementioned drawbacks, a method for operation of a vehicle system is provided. In one example, the method is implemented by a diagnostic controller or processing unit independent from a driveline controller or processing unit, respectively. In such an example, the method includes determining an engagement state of a first clutch in a transmission of the vehicle system. The engagement state is selected from a group of three or more clutch engagement states. The method further includes identifying an unauthorized clutch state based on the engagement state of the clutch and a speed of the vehicle. The method even further includes, responsive to the identification of the unauthorized clutch state, operating the vehicle system in a fault state. Operating the vehicle system in the fault state may include disengaging the first clutch. In this way, the vehicle system can reliably and efficiently identify a clutch fault and operate the vehicle system and specifically the clutch to reduce the chance of unwanted vehicle behaviors. Further, this diagnostic routine may have higher confidence than strategies which guard against the clutch settings deviating from requested settings. Consequently, the diagnostic routine described herein, more confidently guards against undesirable situations, resulting in a setup that is simpler, more effective, less likely to unduly trigger a fault. Further, executing the diagnostics and driveline control schemes on separate controllers or processing units increases the system's adaptability.

In one example, determining the fault state may include comparing the engagement state of the first clutch against an engagement state of a second clutch. If the engagement states are in an unauthorized set of engagement states or they are unauthorized engagement states of opposing clutches, the fault state may be triggered. In this way, fault detection is efficiently and reliably implemented by comparing of the actual states of multiple clutches with unauthorized states.

In one example, the three or more clutch engagement states may include an engaged state, an intermediate state occurring during a shifting transient, and a disengaged state. In this way, the diagnostic logic may be implemented while the transmission is in gear and during shifting operation, thereby expanding the operating conditions under which the logic may be executed. In this example, the engaged state, intermediate state, and the disengaged state each are delineated by a lower pressure threshold and a higher pressure threshold. As such, the disengaged state may be identified when a clutch pressure is below the low pressure threshold. Further, the engaged state may be identified when the clutch pressure is above the high pressure threshold. Additionally, the intermediate state may be identified when the clutch pressure is above the lower pressure threshold and below the higher pressure threshold. Using these thresholds to define the boundaries of the clutch states allows the states to be effectively and efficiently determined. Consequently, the diagnostic routine may be more rapidly implemented, if so desired.

In yet another example, the vehicle system may be operated in the fault state in response to the duration of the unauthorized clutch state exceeding a fault tolerant time. In this way, the diagnostic routine may achieve a higher fault diagnostic confidence by taking into account the reaction time of the clutches, for instance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to clutch control strategies and fault diagnostics in a vehicle system. The system uses efficient logic for confident and independent fault diagnosis in driveline clutches, thereby reducing the likelihood of undesired clutch and more generally vehicle behaviors. The system uses independent controllers, or processing units, to implement nominal clutch control strategies for transmission control and diagnostic strategies for fault detection. As such, diagnostic routines may be executed independently from nominal control strategies and may therefore not be influenced by the nominal control strategies. Further, the separation of control and diagnostic logic allows for independent alteration of control and fault applications, providing increased system adaptability and diagnostic reliability. This adaptability may result in efficient integration of fault diagnostics into an existing control architecture, as well as the ability to independently update or otherwise alter diagnostic and/or control architecture in a wide variety of driveline platforms.

To achieve the diagnostic efficiency gains, the diagnostic routine compares actual clutch states to unauthorized clutch states that are anticipated to cause unwanted kinematic vehicle behavior to determine if a clutch fault is occurring. The clutch states may include an engaged state, an intermediate engagement/disengagement state indicative of a shifting transient, and a disengaged state. In this way, the diagnostic routine may be performed over a wider range of transmission operating conditions that include shifting operation when compared to previous diagnostic strategies. The threshold values that delineate the aforementioned clutch states may be stored in a truth table. This comparison may disregard intended settings to achieve greater accuracy in the fault diagnosis, using lower computational intensive calculations than previous strategies. The diagnostic system may further determine if a fault duration exceeds a fault tolerant time that may be correlated to the clutch's reaction time. By using the fault duration in this manner, the diagnostic accuracy may be further increased. Vehicle speed may also be used to determine if a clutch fault is occurring. For instance, a clutch fault may be ascertained when the clutches are in unauthorized states and the vehicle speed exceeds a threshold value that may be associated with the transmission's current operating gear. Mapping the diagnostic thresholds to values that have a greater chance of causing undesired vehicle movement for fault triggering, as opposed to triggering a fault whenever component settings deviate from intended values, decreases the likelihood of incorrect fault generation. Consequently, the chance of superfluously operating the driveline system in the fault state, which may impact vehicle performance and drivability, is decreased.

Figure 1:
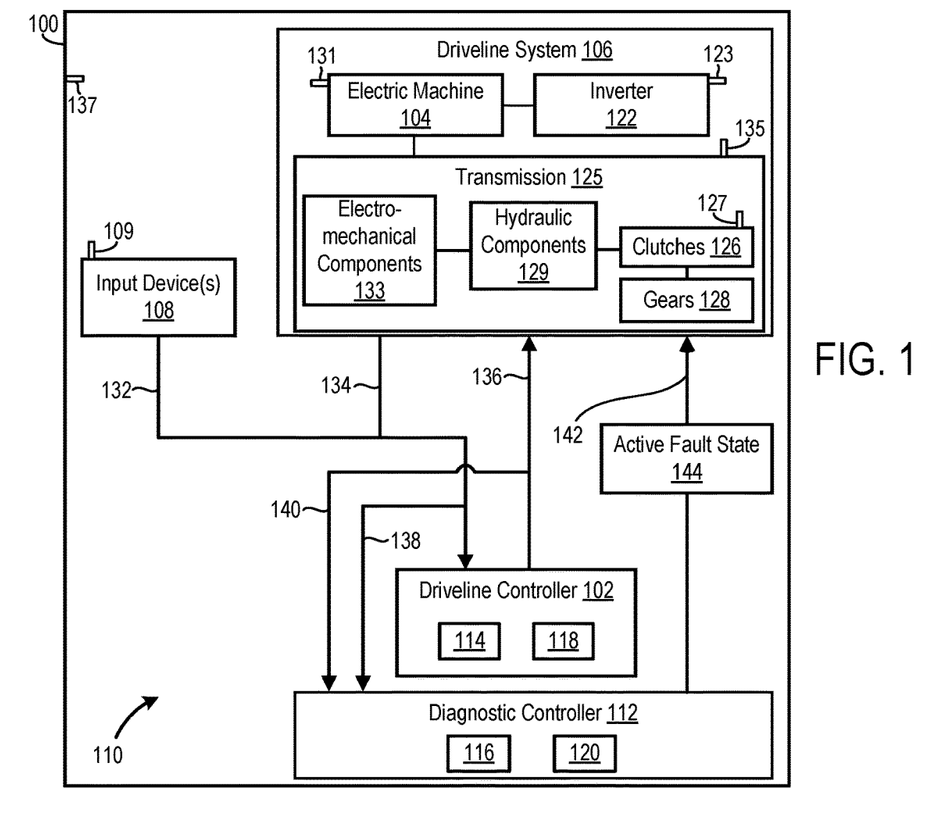
FIG. 1 shows a schematic diagram of a vehicle system with a driveline controller and a diagnostic controller.
Figure 2:
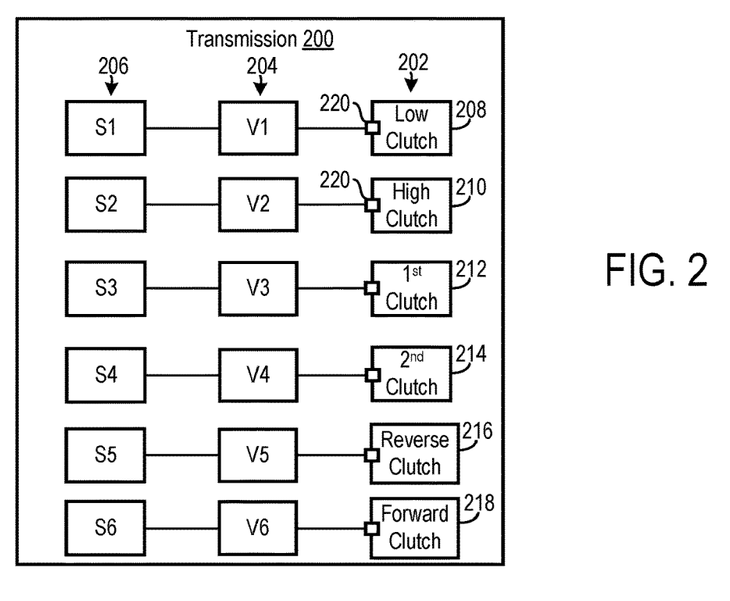
FIG. 2 shows a detailed schematic illustration of an exemplary transmission.
Figure 3:
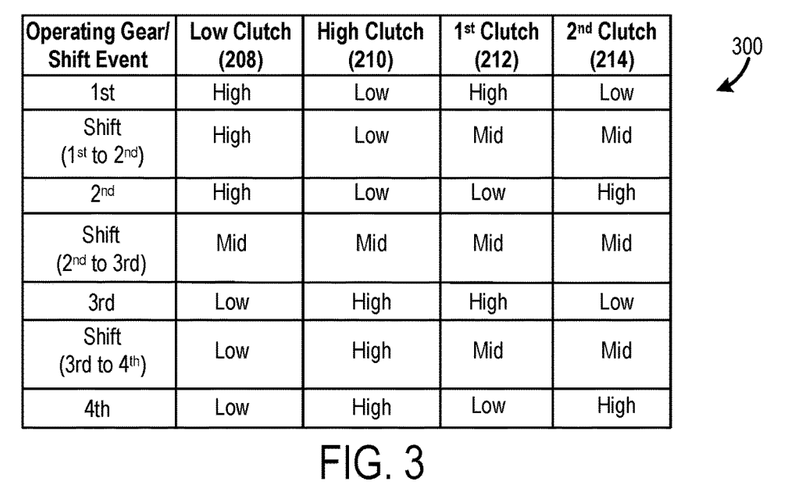
FIG. 3 shows a table of authorized clutch setting.
Figure 4:
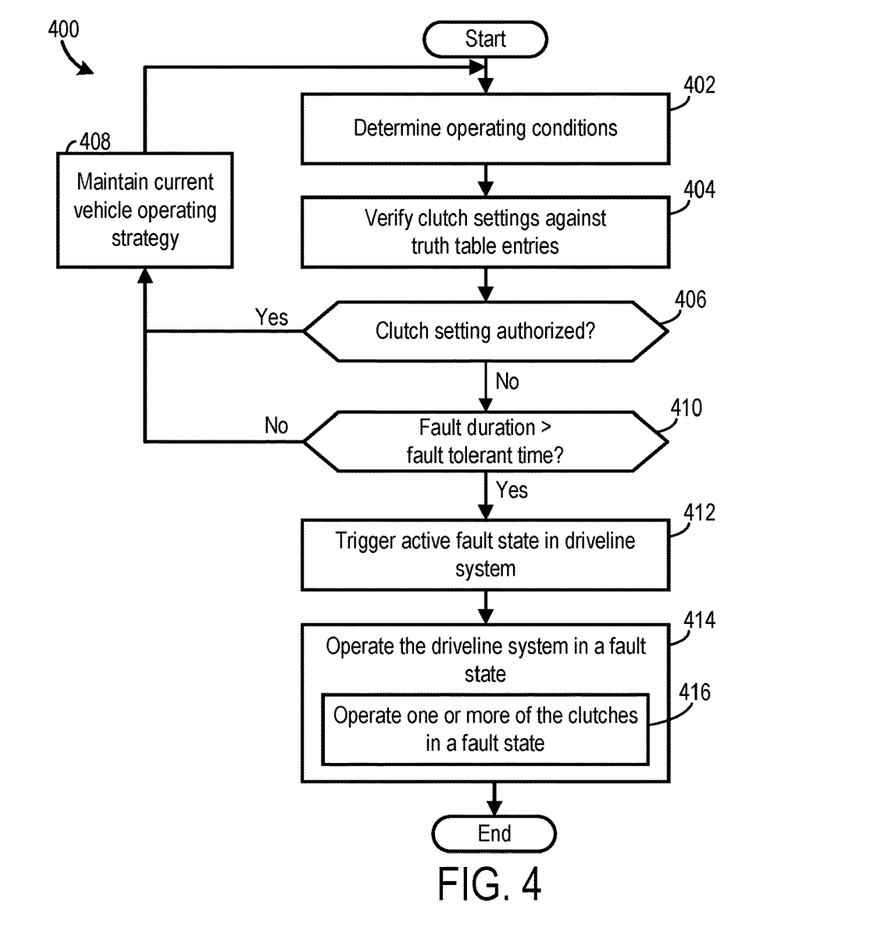
FIG. 4 shows a flow chart of a diagnostic routine for a vehicle system.
Figure 5A:
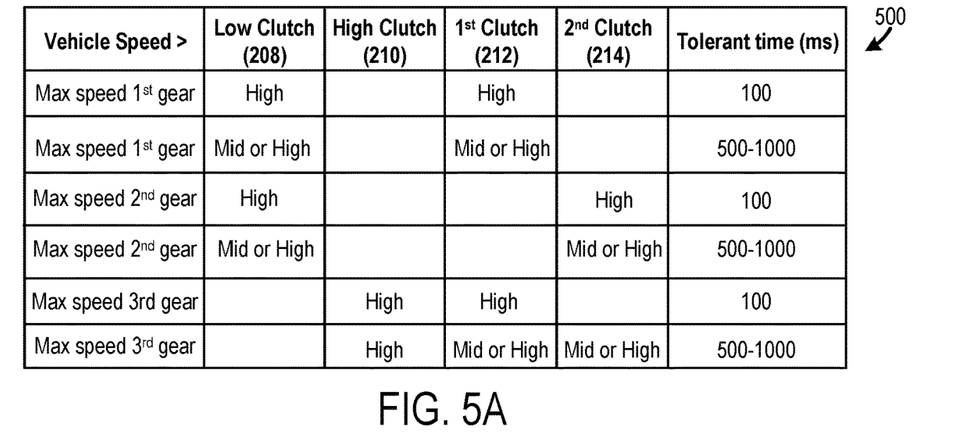
FIGS. 5A-5C show truth tables depicting unauthorized clutch conditions, for use with the diagnostic routine depicted in FIG. 4.
Figure 5B:
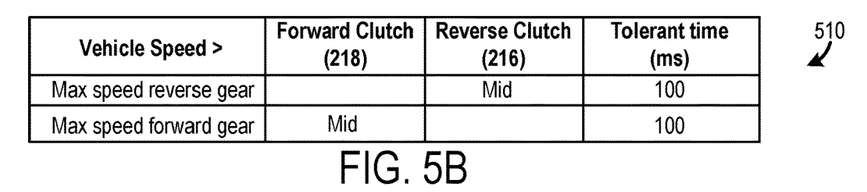
Figure 5C:
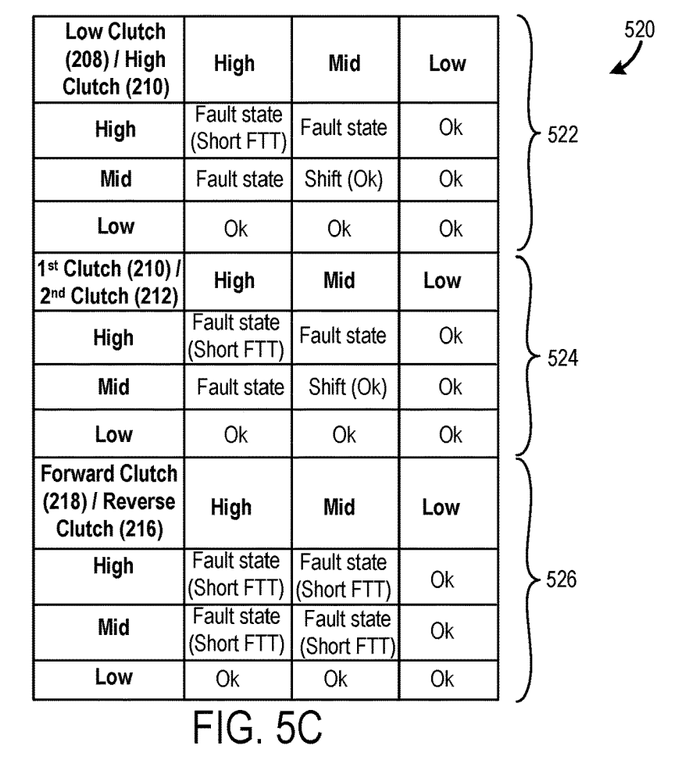
Figure 6:
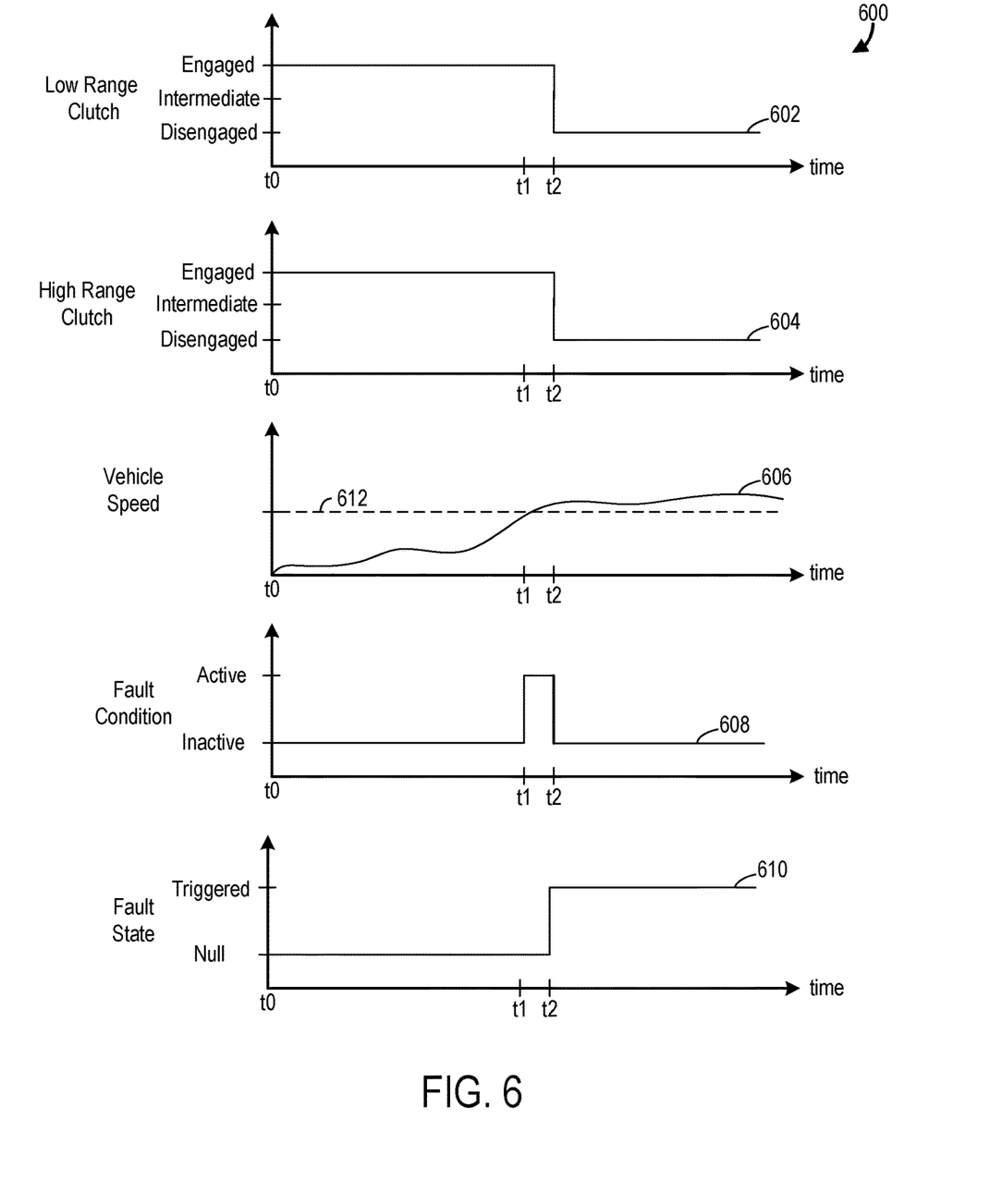
FIG. 6 shows a timing diagram of a use-case diagnostic strategies.

FIG. 1 illustrates the architecture of a vehicle system which uses different controllers to execute control and diagnostic routines. This configuration allows for diagnostic routines to be executed independently from, and in tandem with, nominal control strategies, resulting in a highly reliable setup that may be efficiently implemented for a variety of driveline setups. FIG. 2 shows an exemplary transmission with range, gear, and directional clutches. FIG. 3 shows a table of expected control values over different shift ranges. FIG. 4 depicts a method for diagnosing clutch faults. FIGS. 5A-5C show truth tables for identifying unauthorized clutch conditions. FIG. 6 shows a timing diagram associated with a use-case driveline diagnostic strategy.

FIG. 1 is a schematic illustration of a control and diagnostic architecture for a vehicle 100. The vehicle 100 may be a light, medium, or heavy duty vehicle designed for on and/or off-road travel. To elaborate, the vehicle may include a power source such as an internal combustion engine, an electric machine 104 (e.g., motor-generator), combinations thereof, and the like. Thus, the vehicle may be a hybrid vehicle or a battery electric vehicle (BEV), in different examples. Alternatively, the vehicle may be an internal combustion engine vehicle, and the electric machine 104 may be omitted.

A driveline controller 102, a driveline system 106 with a plurality of mechanical vehicle components, and one or more input device(s) 108 may reside in a system 110 of the vehicle 100. The system 110 further includes a diagnostic controller 112 in electronic communication with a driveline controller 102, the driveline system 106, and the input devices 108. These components may be in electronic communication (e.g., wired and/or wireless electronic communication) with one another to facilitate data transfer therebetween. However, the diagnostic controller 112 is independent from the driveline controller 102. Therefore, the diagnostic controller 112 and the driveline controller 102 may be spaced away from one another and have separate enclosures. In other examples, the diagnostic controller 112 and the driveline controller 102 may have separate circuitry to maintain independent processing operation but may be collocated in a common housing. The diagnostic controller 112 represents a driveline guard and may include multiple logic modules for monitoring and preventing a fault (e.g., undesired behavior) in the system 110, which will be discussed further with reference to FIGS. 2-6.

In one example, the driveline controller 102 and the diagnostic controller 112 may each include a processor 114, 116 and memory 118, 120, respectively, holding instructions stored therein that when executed by the processor cause the controller to perform various methods, control techniques, etc. described herein. The processors 114, 116 may include one or more processing units and/or other suitable types of circuits. The memory 118, 120 may include known data and storage mediums, such as random access memory, read only memory, keep alive memory, combinations thereof, etc. The memory 118, 120 may be distinct devices that execute separate logic modules (e.g., a driveline control module and a diagnostic module, respectively), in one example. The memory devices may therefore be collocated on a common board or chip, for instance, or may be spaced away from one another, in alternate configurations. To elaborate, the driveline controller 102 and the diagnostic controller 112 may be physically separate and distinct from the driveline memory 118 and diagnostic memory 120. As such, the circuit boards may be at least partially housed in separate enclosures, in one example, or may be physically separate components collocated in a common enclosure, in another example. Alternatively, in other examples, a single controller with a multi-core processor (e.g., dual-core processor) may be used in the system. In such an example, the driveline control and diagnostic applications may be independently executed via distinct processing units (e.g., cores) and stored on separate memory devices. In this way, the driveline control and diagnostic applications may retain independence while the controller achieves a more space and energy efficient architecture.

The processing unit(s) of the driveline controller 102 and the diagnostic controller 112 may carry out different nominal control and diagnostic logic modules, respectively. As described herein, a logic module is a set of instructions (e.g., tasks, algorithms, and the like) that performs selected operations, functions, etc. when executed. Further, as described herein, nominal component control may include controlling operation of a component using a model (e.g., estimated model) of the driveline system or more particularly the transmission. The driveline controller 102 may include applications designed to implement control strategies for the mechanical component in the driveline system 106. Conversely, the diagnostic controller 112 may include applications for monitoring and verifying operation of the mechanical components in the driveline system 106. In this way, the diagnostic controller may act as a driveline guard. Further, separating the logic modules in this manner allows the control and diagnostic modules to be independent from one another, and may further allow for independent alteration of each, providing increased system adaptability. Further, the adaptability resulting from the independence of these applications may allow for efficient integration of diagnostic routines into an existing control architecture, as well as the ability to independently update or otherwise alter diagnostic and/or control architecture.

The components in the driveline system 106 may include a transmission 125. The transmission 125 includes one or more clutches 126 and gears 128. The clutches 126 may be engaged and disengaged to place the vehicle in a plurality of forward drive gears, a reverse gear, and a neutral mode, for example. The forward drive gears may have discrete gear ratios which may be operator selectable and/or programmatically selected by the driveline controller based on vehicle speed and/or load. As described herein, an engaged state (e.g., fully engaged state) of a clutch may be a state where torque is transferred through the clutch with little or no slipping, an intermediately engaged/disengaged state may be a state in which torque is transferred through the clutch but slipping between clutch discs is occurring, and a disengaged state (e.g., fully disengaged state) of a clutch may be a state in which substantially no torque is transferred through the clutch. Thus, the clutches described herein may include friction discs and separator discs that frictionally engage and disengage one another during clutch engagement and disengagement to permit and inhibit, respectively, torque transfer between shafts or other rotational components coupled to the clutch.

The clutches 126 may be actuated via hydraulic components 129 (e.g., hydraulic valves, hydraulic conduits, and the like) and electro-mechanical components 133 (e.g., solenoid valves). For instance, control commands may be sent to the electro-mechanical components 133 which modulate pressure regulating signals to the hydraulic components 129 which in turn augment the pressure applied to hydraulic actuators (e.g., pressure pistons) of the clutches. In this way, the clutches may be opened and closed. However, alternate architectures for actuating the clutches have been contemplated. For instance, the clutches may be pneumatically actuated, in other examples.

The components in the driveline system 106 may further include an inverter 122 and an electric machine 104 mechanically coupled to the transmission 125. Additionally or alternatively, an internal combustion engine may be mechanically coupled to the transmission 125. The electric machine 104 may function as a motor for generating rotational energy to be transferred to vehicle wheels via axle shafts and, in some cases, as a generator for receiving rotational energy and transforming it into electrical energy. The electric machine may therefore include a rotor, stator, housing, and the like.

The electric machine 104 may be an alternating current (AC) type machine, such as a multi-phase motor-generator, in one example. In such an example, an electrical inverter 122 which converts direct current (DC) power from a power source (e.g., battery, capacitor, and/or other suitable energy storage devices) to AC power or vice versa, may be included in the driveline system 106. Additionally, a sensor 123 coupled to or integrated into the inverter 122 may be able to detect the power supplied to the electric machine 104 which may be used to determine the torque generated by the electric machine. Additionally or alternatively, a sensor 131 may be coupled to the electric machine 104 to determine the torque generated by the electric machine. This sensor data may be used at the diagnostic controller 112 to determine fault conditions, as will be described in further detail herein. In other examples, when an internal combustion engine is used as the motive power source for the vehicle, the electric machine 104 and the inverter 122 may be omitted.

The transmission 125 may be mechanically coupled to an axle for transmitting mechanical power to drive wheels. Shafts, rotating joints, and the like may be used to transfer mechanical power from the transmission 125 to the axle, in one example. The axle may include a differential, axle shafts, and the like, as is known in the art. The transmission 125 may receive mechanical power from, or transfer mechanical power to, the electric machine 104 (e.g., motor-generator) or other suitable motive power source (e.g., an internal combustion engine) via a driveshaft and/or other suitable mechanical components.

In FIG. 1, arrows characterize a data flow pattern in the system. To elaborate, arrows 132, 134 indicate the transfer of data between the input device 108 and the driveline system 106, respectively, and the driveline controller 102. Additionally, arrow 136 indicates the transfer of data between the driveline controller 102 and the driveline system 106. Arrows 138, 140 indicate the transfer of data redirected from input device 108 and from driveline controller 102, respectively, to the diagnostic controller 112. Arrow 142 indicates the transfer of data such as an active fault state command 144, from the diagnostic controller 112 to the mechanical vehicle component of the driveline system 106. As such, each arrow indicates data that may be sent from controller hardware to a vehicle component and received by said vehicle component, or vice versa.

The driveline controller 102 and/or diagnostic controller 112 may receive inputs from sensors such as the current sensor 123 coupled to or integrated within the inverter 122, one or more clutch position sensor(s) 127, an input device position sensor 109, the electric machine sensor 131, a transmission speed sensor 135, a vehicle speed sensor 137, and the like. In one example, the driveline controller 102 may receive the sensor signals and relay these signals to the diagnostic controller 112. Alternatively, at least a portion of the sensor signals may be sent in parallel to the diagnostic controller 112 and the driveline controller 102.

The input device(s) 108 is designed to generate an input signal or command in response to operator interaction with the device. This signal or command is then transmitted to the driveline controller 102 for controlling operation of one or more of the mechanical vehicle components within driveline system 106 described above. Hence, the input device(s) 108 may prompt adjustment of one or more vehicle operating parameters such vehicle speed, transmission gear ratio, motor power, engine power, etc. Examples of the input device include a drive pedal, a brake pedal, a gear selector, a gear stick, a clutch pedal, buttons, knobs, touch interfaces, combinations thereof, and the like.

The drive pedal (e.g., throttle pedal) may generate a signal indicative of a power request. During normal operation, the driveline controller may adjust the electric machine 104 and/or the inverter 122 to achieve a power set-point correlated to the operator power request.

Further, the operator may interact with the gear selector (e.g., a Reverse-Neutral-Drive gear selector), to select a drive mode (e.g., reverse drive, neutral, or forward drive). In a normal operating mode, responsive to selection of the drive mode, the driveline controller 102 may control the transmission 125 to open or close one or more clutches 126 to place the transmission 125 in the selected mode. In the selected drive mode, the driveline controller may automatically adjust the transmission 125 to place the transmission in a desired gear based on vehicle speed and load. For instance, the transmission may have multiple discrete gears with corresponding gear ratios and the transmission may automatically shift between the gears. Alternatively, the transmission may be a manual type transmission which shifts between the gears in response to operator interaction with a gear shifter. Hence, in the above described examples, a vehicle operator may request adjustment in wheel torque/power and/or transmission gear selection, whereby, in a nominal mode of operation, the driveline controller 102 may adjust components in the driveline system responsive to the operator input.

Although the driveline controller 102 receives requests from the input device 108 to control operation of the various mechanical vehicle components described herein, the diagnostic controller 112 may also monitor these requests and other vehicle operating conditions and implements diagnostic routines. Specifically, the diagnostic routines may not take into account intended component settings and instead focus on comparing the actual settings with a predefined set of unauthorized settings, to simplify diagnostics. When the actual settings match one of the unauthorized settings, the diagnostic controller 112 may override the driveline controller 102 in order to operate the components in the driveline system 110 such as the clutches in an active fault state. In one example, the diagnostic controller 112, upon identifying a fault condition, may trigger an active fault state, as indicated at 144, by disengaging the clutches 126, thus inhibiting transfer of power through the clutches. This command may override a driveline control command to engage the clutches or sustain engagement of the clutches.

In an additional or alternative example, upon identifying a fault condition, the diagnostic controller 112 may trigger an active fault state in the vehicle system 110 by interrupting the transfer of AC power from the inverter 122 to the electric machine 104 (e.g., by opening one or more switches in the inverter 122 or otherwise decreasing the electric power flow from the inverter to the electric machine). As such, current flow from the inverter to the electric machine may be stopped or significantly decreased when the fault condition is identified. By allowing the diagnostic controller 112 to override the nominal control commands from the driveline controller 102 during a fault condition, the system may effectively and efficiently execute diagnostic routines to quickly discontinue or avoid undesired kinematic behavior of the vehicle.

FIG. 2 shows an example of a transmission 200. It will be understood that the transmission depicted in FIG. 2 is an example of the transmission 125, depicted in FIG. 1 and these transmissions may therefore share common structural and functional features. As such, the transmission 200 may be included in a driveline system, such as the driveline system 106, shown in FIG. 1.

The transmission 200 includes multiple clutches 202, hydraulic valves 204 (V1-V6), and solenoid valves 206 (S1-S6). Specifically, each clutch may have a corresponding hydraulic valve and solenoid valve, in one example. These clutches may include hydraulic actuators 220 (e.g., hydraulic pistons) which are hydraulically connected to the corresponding hydraulic valves 204 which augment the pressure of the fluid (e.g., oil) on the hydraulic actuator. The solenoid valves 206 may be in electronic communication with the vehicle system controllers (e.g., the driveline controller 102 and the diagnostic controller 112) shown in FIG. 1). The solenoid valves 206 may be designed to adjust the hydraulic valves 204 based on controller commands. In turn, adjustment of the hydraulic valves allows the hydraulic pressure exerted on hydraulic actuators 220 to be adjusted for clutch engagement and disengagement.

The clutches 202 may specifically include a low range clutch 208, a high range clutch 210, a first clutch 212, a second clutch 214, and a reverse clutch 216, and/or a forward clutch 218. These clutches may be delineated into range clutches (e.g., clutches 208, 210), gear clutches (e.g., clutches 212, 214) and directional clutches (e.g., clutches 216, 218). Each of these pairs of clutches may be referred to as opposite clutches. The range, gear, and directional clutches may have different configurations that demand different levels of pressure for engagement, in one example. However, in other examples, the range, gear and/or directional clutches may have similar pressure levels for full engagement. Control of these clutches may be coordinated to selectively engage and disengage desired clutches during different operating conditions to achieve at least four forward drive gears and one reverse drive gear. However, transmissions with an alternate number of gear ratios and therefore clutch architectures have been contemplated. For instance, the transmission may include three or more range clutches and/or three or more gear clutches.

For each of the clutches, at least three ranges of engagement (e.g., full engagement, intermediate engagement/disengagement, and full disengagement) may be established. These ranges may be bounded by thresholds. The ranges of engagement may be correlated to the pressures exerted on the clutches via the hydraulic actuators 220 (e.g., hydraulic pistons) which is controlled via the hydraulic valves 204, as previously discussed. Additionally or alternatively, the ranges of clutch engagement may be correlated to the commanded drive current sent to the solenoid valve associated with the clutch. These levels of pressure or current may be delineated as high levels, mid-levels, or low levels which correspond to the clutches being in engaged states, slipping states, and disengaged states, respectively. The states may be included in a group used in the diagnostic routes expanded upon herein. The high levels of pressure and current may therefore be maintained when driving a selected transmission gear, the mid-levels of pressure and current may therefore occur during shifting operation, and the low levels of pressure and current may be maintained when clutch disengagement is wanted. As such, the mid-levels are intermediate levels which can be a value anywhere between the low level threshold and the high level threshold and.

In one use-case example, when the clutch is one of the directional clutches (e.g., clutch 216, 218), the high pressure level threshold may be 16 bar and the corresponding high drive current threshold may be 900 milliamps (mA). Further in such an example, when the clutch is one of the range clutches (e.g., the high clutch 210 or the low clutch 208) the high pressure level threshold may be 12 bar and the corresponding high drive current threshold may be 900 mA. Further in such an example, when the clutch is one of the gear clutches (e.g., clutches 212, 214), the high pressure level threshold may be 18 bar and the corresponding drive current threshold may be 1400 mA. Continuing with the use-case example, the low level of pressure and current, correspondingly, when the clutch is considered to be disengaged may be kept above a maintained pressure or current level (e.g., 200 mA) for that clutch and below a value at which pressure increases or below the kiss point (e.g., the pressure when the clutch plates frictional engage and begin torque transfer). The kiss point current may be 400 mA, in one specific example, and at 400 mA an increase in drive current may lead to an increase in clutch pressure. These low pressure and current levels may be adjusted based on operating conditions. It will also be understood, that the mid-level pressure and current for the clutches may be between the abovementioned high levels and the low levels of pressure and current.

The actual threshold values (for each clutch) may be set so that variances over time and variances in between instances will not trigger unnecessary fault states in normal operation (e.g., during shifting operation). Consequentially, the high threshold may be on the lower variance boundary, and the low threshold may be on the higher variance boundary.

FIG. 3 shows an exemplary table 300 that indicates the expected levels (of either pressure or drive current) for each clutch in the transmission 200 over different shift ranges. However, it will be understood that different expected levels and/or gradations of levels may be used in alternate embodiments. The rows indicate the transmission's operating gears (e.g., first gear, second gear, third gear, and fourth gear) or active gears during shift events (e.g., the transition from the first gear to the second gear, the transition from the second gear to the third gear, and the transition from the third gear to the fourth gear). The columns indicate the expected levels in each of the gears or during the shifting events for the low clutch 208, the high clutch 210, the first clutch 212, and the second clutch 214. Further, the forward clutch 218 may be engaged and the reverse clutch 216 may be disengaged in each of the gears and during shifting transients.

As shown in table 300, in the first gear, the low clutch 208 is operated with a high actuation pressure and current level, correspondingly, the high clutch 210 is operated with a low actuation pressure and current level, correspondingly, the first clutch 212 is operated with a high actuation pressure and current level, correspondingly, and the second clutch 214 is operated with a low actuation pressure and current level, correspondingly.

When the transmission is shifted between the first and second gears, the low clutch 208 is operated with a high actuation pressure and current level, correspondingly, the high clutch 210 is operated with a low actuation pressure and current level, and the first and second clutches 212, 214 are operated with the mid-levels of actuation pressure and current.

In the second gear, the low clutch 208 is operated with a high actuation pressure and current level, correspondingly, the high clutch 210 is operated with a low actuation pressure and current level, the first clutch 212 is operated with a low actuation pressure and current level, and the second clutch 214 is operated with a high actuation pressure and current level.

When the transmission is shifted between the second and third gears, each of the low clutch 208, the high clutch 210, the first clutch 212, and the second clutch 214 are operated with mid-level actuation pressures and currents.

In the third gear, the low clutch 208 is operated with a low actuation pressure and current level, correspondingly, the high clutch 210 is operated with a high actuation pressure and current level, the first clutch 212 is operated with a high actuation pressure and current level, and the second clutch 214 is operated with a low actuation pressure and current level.

When the transmission is shifted between the third and fourth gears, the low clutch 208 is operated with a low actuation pressure and current level, correspondingly, the high clutch 210 is operated with a high actuation pressure and current level, and the first clutch 212 and the second clutch 214 are operated with mid-levels of actuation pressure and current.

In the fourth gear, the low clutch 208 is operated with a low actuation pressure and current level, correspondingly, the high clutch 210 is operated with a high actuation pressure and current level, the first clutch 212 is operated with a low actuation pressure and current level, and the second clutch 214 is operated with a high actuation pressure and current level. However, in other examples, when the layout of the clutches and gears in the transmission is altered, the clutches may be operated with different pressures and currents during the shift events and while operating in the different gears.

FIG. 4 shows a method 400 for fault diagnostics of clutches in a vehicle system. The method 400 as well as other methods described herein may be executed by the diagnostic controller 112, driveline controller 102, and vehicle system 110 shown in FIG. 1. Alternatively, the method 400 and/or the other methods described herein may be implemented by other suitable controllers, vehicle system, and corresponding components or by a common controller with multiple processors and memory devices that separately execute control and diagnostic modules. Further, the instructions for carrying out the method 400 and the rest of the methods described herein may be executed by one or more controllers based on instructions stored on different memory devices and in conjunction with signals received from the vehicle system. The controller(s) may employ actuators of the vehicle system to adjust vehicle operations, according to the methods described below.

At 402, the method includes determining vehicle operating conditions. These operating conditions may be determined via the collection of vehicle operating data from the vehicle system via a capture unit of a controller. For example, a speed sensor may be used to measure an actual vehicle speed. The operating conditions may further include the position of one or more clutches. To elaborate, the transmission's clutch settings may be identified as either in an engaged state, in an intermediate state of engagement/disengagement, or in a disengaged state. As such, the clutches may each be identified in one of the three states. However, in other examples, the intermediate state may be delineated into different degrees of partial engagement.

At 404, the method includes verifying the clutch settings against a truth table to identify a fault condition. The truth table may include upper and lower vehicle speed thresholds that correspond to clutch positions/settings. In other examples, the truth table may indicate other ranges of operating parameters to identify unauthorized conditions. The truth table may therefore express sets of conditions (e.g., clutch positions, vehicle speeds, etc.) that are unwanted. Exemplary truth tables are described in greater detail herein with regard to FIG. 5A-5C. Next, at 406, the method includes judging if the identified clutch settings are authorized.

If the vehicle speed and clutch positions are authorized based on the truth table verification (YES at 406), the method moves to 408, where the method includes maintaining the current vehicle operating strategy. For instance, the clutch positions may be maintained or the current shifting strategy may be implemented via commands from the driveline controller. Step 408 may be executed by the driveline controller and the other steps in the method (steps 402-406 and steps 410-416) may be executed by the diagnostic controller.

If the vehicle speed and clutch positions are determined to be unauthorized (NO at 406), a fault condition is identified and the method moves to 410. At 410, the method includes determining the duration of the fault condition (e.g., the time passed since the identification of the fault condition), as determined in the aforementioned steps, and verifies the fault duration against a fault tolerant time, as previously described. If the fault duration is less than the fault tolerant time (NO at 410), the method moves to 408. However, if the fault duration exceeds the fault tolerant time (YES at 410), the method continues to 412. Using the fault tolerant time permits diagnostic confidence to be further increased, thereby reducing the chance of false fault identification.

At 412, the method includes triggering an active fault state in the driveline system (e.g., the transmission clutches). Next, at 414, the method includes operating the driveline system in a fault state. Operating the driveline system in the fault state may include at 416, operating one or more of the clutches in an active fault state which may include opening the clutches to inhibit torque transfer from the transmission to the drive wheels, and overriding a command to close the clutches. Thus, operating the driveline system in the fault state may include overriding nominal control commands generated by the driveline controller. Further in some instances, operation of the electric machine or another suitable motive power source supplying mechanical power to the transmission may be discontinued when the driveline is operated in the fault state.

Method 400 enables unauthorized clutch setting which may lead to undesired vehicle motion to be quickly and confidently determined. Subsequent to the rapid determination of the unauthorized clutch positions, steps are taken to discontinue the unauthorized clutch settings. Unanticipated changes in driveline performance may therefore be mitigated.

FIGS. 5A-5C depict exemplary truth tables 500, 510, and 520 that may be used in the diagnostic routines described herein. Although, the truth tables are discussed with regard to the clutches 208-218, alternate truth tables and/or diagnostic algorithms may be used to determine the presence of clutch fault conditions. The truth tables 500, 510, and 520 may be stored as lookup tables in the driveline's diagnostic controller (e.g., the diagnostic controller 112, shown in FIG. 1). These tables include pressure and/or current values (High, Mid, and Low) as well as tolerant times and blank fields indicate that guard logic is not implemented for that clutch and vehicle speed threshold. The truth tables indicate conditions that may trigger a fault state to reduce the likelihood of the clutches being operated outside of desirable ranges. To elaborate, each row may represent a guard logic equation. At a given vehicle speed, all of the checks (e.g., guard logic equations) in the truth table may be executed, in one specific example. Alternatively, a portion of the checks may be implemented, to conserve computing resources, in other examples. Additionally, if two tests indicate a fault condition is occurring, the test with the shortest tolerant time may trigger the fault state.

The specific tolerant times and clutch pressure and/or current levels shown in the truth tables are exemplary in nature. Therefore, in other examples, these values may be altered based on a number of factors such as the transmission layout, the types of clutches and actuation circuitry used in the transmission, the transmission operating temperature, etc. Although fault tolerant times are shown in tables 500 and 510, the logic may not use tolerant times, in other embodiments. In even alternate embodiments, the guard logic may be implemented without taking into account vehicle speed.

Turning specifically to FIG. 5A which shows the truth table 500 of unauthorized clutch settings and their tolerant times before triggering a fault state. The rows of the truth table 500 indicate vehicle speed thresholds (e.g., maximum speed for the first gear, maximum speed for the second gear, and maximum speed for the third gear) for each of the first through third gears. These speed thresholds as well as the other speed thresholds described herein may be determined based on factors such as the transmission's gear ratios and therefore may be non-zero values. The vehicle speed may be determined using sensor inputs and/or modeling. For instance, wheel speed sensor may be used to determine vehicle speed or the transmission output speed, ascertained using a sensor, may be correlated to the vehicle speed. Conversely, the columns of the truth table indicate the level of actuating pressure and current applied to the low clutch 208, the high clutch 210, the first clutch 212, and the second clutch 214 as well as the tolerant time for each guard logic equation. Thus, the guard logic equation for first row may read as follows:

IF (actual vehicle speed>max speed for the first
   gear) AND (drive current of the low
   clutch==High) AND (drive current of the first
   clutch==High) THEN trigger the fault state is
   the logic holds for 100 milliseconds (ms)   {equation 1}

The guard logic for the second row may read as follows:

IF (actual vehicle speed>max speed first gear) AND
   (drive current of low clutch==High or Mid)
   AND (drive current of first clutch==High or
   Mid) THEN trigger safe state if the logic holds
   for 500 ms   {equation 2}

In alternate examples, the high clutch and/or the second clutch may have low, medium, or high values in the second row. Further, the guard logic equations for the third, fourth, fifth, and sixth rows may be interpreted in a similar manner and additional description of these equations is omitted for brevity.

FIG. 5B shows a truth table 510 of unauthorized clutch settings for the forward clutch 218 and the reverse clutch 216 and their tolerant times for triggering a fault state. The rows of the truth table 510 indicate vehicle speed thresholds (e.g., maximum speed for the reverse gear and maximum speed for the forward gear) for each of the first through third gears. In one specific use-case example, the maximum speed for the reverse gear may be 3 meters per second (m/s) and conversely, the maximum speed for the forward gear may be −3 m/s. The guard logic for the first row may read as follows:

IF (actual vehicle speed>max speed Reverse gear)
AND (drive current of Reverse clutch==Mid or
High) THEN trigger safe state if this holds for
100 ms     {equation 3}

The guard logic equations for the second row may be interpreted in a similar manner and additional description of these equations is omitted for brevity.

FIG. 5C shows a truth table 520 of opposite clutches and undesired actuation pressure and/or drive current values (High, Mid, and Low) that may be recognized as fault states. To elaborate, the truth table 520 includes three sections 522, 524, and 526. The first section 522 shows clutch settings for the low clutch 208 and the high clutch 210 that are permitted as well as setting for the clutches that trigger a fault state and are therefore unauthorized. These unauthorized settings and the other unauthorized settings may be organized in sets. For instance, unauthorized settings in the first section 522 of the table 500 may be included in a set of settings. The second section 524 shows clutch settings for the first clutch 210 and the second clutch 212 that are permitted as well as setting for the clutches that trigger a fault state. The third section 526 shows clutch settings for the forward clutch 218 and the reverse clutch 216 that are permitted as well as setting for the clutches that trigger a fault state. The third section 526 shows clutch settings for the forward clutch 218 and the reverse clutch. In each of the sections, a fault state with a shorter fault tolerant time (FTT), such as 100 ms, in one use-case example, and a fault state with a longer fault tolerant time, such as 500 ms, in this use-case example.

The guard logic equations for the high and low clutch section 522 may read as follows:

IF ((drive current of Low clutch==High) AND (drive
current of High clutch==High)) THEN trigger
fault state if this holds for 100 ms     {equation 4}

IF ((drive current of Low clutch==High) AND (drive
current of High clutch==Mid)) OR ((drive current of Low clutch==Mid) AND (drive current
of High clutch==High)) THEN trigger safe state
if this holds for 500 ms     {equation 5}

The guard logic equations for the first and second clutch section 524 may be similar to equations 4 and 5. Further, the guard logic equation for the forward and reverse clutch section 526 may read as follows:

IF ((drive current of Forward clutch==High or Mid)
AND (drive current of Reverse clutch==High or
Mid)) THEN trigger fault state if this holds for
100 ms     {equation 6}

The truth table 500 allows opposite clutch engagement to be quickly and efficiently recognized, and discontinued by triggering a fault state and opening one or both of the clutches, for instance. In other words, the truth table 500 allows undesired engagement of opposite clutches to be rapidly identified.

FIG. 6 shows an exemplary and prophetic timing diagram 600 of a use-case diagnostic control strategy for clutches in a drivelines system. In each plot of the timing diagram, time is indicated on the abscissa and increases in the direction of the arrow. The ordinates for plots 602, 604 indicate the actual clutch position setting (engaged, intermediately engaged, and disengaged) of a low range clutch (e.g., the low clutch 208, shown in FIG. 2) and a high range clutch (e.g., the high clutch 210, shown in FIG. 2), and the ordinate for plot 606 indicates the vehicle speed, which increases in the direction of the arrow. The ordinate of plot 608 indicates the fault condition (activate and inactive). FIG. 6 also shows a vehicle speed threshold 612. The ordinate of plot 610 indicates the fault state (triggered and null).

From t0 to t1, vehicle speed increases while in the high and low range clutches are engaged. In some cases, a diagnostic controller may determine the vehicle speed and the clutch positions and verify these settings against a truth table (e.g., table 520, shown in FIG. 5C) to identify unauthorized clutch positions indicative of a driveline fault and specifically a clutch fault.

At t1, the vehicle speed surpasses a threshold speed 612, and the diagnostic controller recognizes that the while the high and low range clutches are engaged and the threshold speed is surpassed, an unauthorized setting is occurring. Thus, the diagnostic controller recognizes a fault is occurring, as indicated in plot 608.

From t1 to t2, the diagnostic controller measures the duration of the clutch fault condition. The time between t1 and t2 may be the fault tolerant time described above, which may be used as an entry condition for activating the fault state of the first and second clutches. At t2, the duration of the fault state reaches the fault tolerant time, the fault state is triggered by disengaging the low range clutch and the high range clutch and sustaining these clutches in disengaged states. Thus, unauthorized clutch setting may be quickly and confidently recognized using the unauthorized clutch positions mapped to a speed range and then discontinued to reduce the likelihood of clutch degradation and unwanted kinematic behavior of the vehicle.

The technical effect of the vehicle system diagnostic and operating methods described herein is to efficiently and confidently diagnose driveline and specifically clutch faults through the use of a predetermined set of unauthorized clutch settings. This diagnostic strategy allows the chance of unwanted vehicle behaviors that may cause unanticipated changes in driveline performance such as unintended kinematic vehicle behavior to be reduced or avoided, in certain cases. The diagnostic strategy also reduces the chance of clutch degradation, thereby increasing clutch longevity.

The invention will be further described in the following paragraphs. In one aspect, a method for operation of a vehicle system is provided that includes: at a diagnostic controller or processing unit independent from a driveline controller or processing unit, respectively: determining an engagement state of a first clutch in a transmission of the vehicle system, wherein the engagement state is selected from a group of three or more clutch engagement states; identifying an unauthorized clutch state based on the engagement state of the clutch and a speed of the vehicle; and responsive to the identification of the unauthorized clutch state, operating the vehicle system in a fault state.

In another aspect, a vehicle system is provided that includes: a transmission including a plurality of clutches configured to selectively engage and disengage to shift between a plurality of discrete gear ratios; a diagnostic controller or processing unit including: instructions that, when executed, cause the diagnostic controller or processing unit to: determine an engagement state of each of a plurality of clutches, wherein each of the engagement states are selected from a group of engagement state that includes an engaged state, an intermediate state, and a disengaged state; and operate the vehicle system in a fault state based on a comparison of the engagement states of the plurality of clutches.

In yet another aspect, a method for operation of a driveline system is provided that includes: at a diagnostic controller independent from a driveline controller, determining a vehicle speed; determining engagement states of a first clutch and a second clutch in a transmission based on a pressure or current associated with each of the first and second clutches, wherein the engagement state of each clutch is selected from a group of three or more clutch engagement states that includes an engaged state, an intermediate state, and a disengaged state; identifying an unauthorized clutch state based on a comparison between the engagement states of the first and second clutches and a set of unauthorized clutch states; and responsive to the identification of the unauthorized clutch state and the vehicle speed exceeding a threshold speed, operating the first clutch and the second clutch in a fault state.

In any of the aspects or combinations of the aspects, the three or more clutch engagement states may include an engaged state, an intermediate state occurring during a shifting transient, and a disengaged state.

In any of the aspects or combinations of the aspects, the engaged state, intermediate state, and the disengaged state may be each by delineated by a lower pressure threshold and a higher pressure threshold; the disengaged state is identified when a clutch pressure is below the lower pressure threshold; the engaged state may be identified when the clutch pressure is above the higher pressure threshold; and the intermediate state may be identified when the clutch pressure is above the lower pressure threshold and below the higher pressure threshold.

In any of the aspects or combinations of the aspects, the engagement state of the first clutch may be determined based on a pressure applied to the clutch and/or a drive current provided to an actuator of the first clutch.

In any of the aspects or combinations of the aspects, identifying the unauthorized clutch state may include: comparing the engagement state of the first clutch against an engagement state of a second clutch; and determining that the first clutch and the second clutch are in unauthorized engagement states.

In any of the aspects or combinations of the aspects, the vehicle system may be operated in the fault state in response to the duration of the unauthorized clutch state exceeding a fault tolerant time.

In any of the aspects or combinations of the aspects, the fault tolerant time may be variable.

In any of the aspects or combinations of the aspects, the vehicle system may be operated in the fault state in response to a vehicle speed exceeding a threshold speed.

In any of the aspects or combinations of the aspects, the first clutch may be a directional clutch, a gear clutch, or a range clutch.

In any of the aspects or combinations of the aspects, the intermediate state may be associated with a shifting transient.

In any of the aspects or combinations of the aspects, the plurality of clutches may include one or more range clutches, one or more gear clutches, and one or more directional clutches.

In any of the aspects or combinations of the aspects, operating the vehicle system in a fault state may include disengaging the plurality of clutches.

In any of the aspects or combinations of the aspects, the vehicle system may be operated in a fault state when a vehicle speed exceeds a threshold speed.

In any of the aspects or combinations of the aspects, the vehicle system may be operated in a fault state when a duration of an unauthorized clutch state exceeds a fault tolerant time.

In any of the aspects or combinations of the aspects, the intermediate state may occur during a shifting transient.

In any of the aspects or combinations of the aspects, the unauthorized clutch state may include an engaged or intermediate state of both of the first and second clutches.

In any of the aspects or combinations of the aspects, the first and second clutches may be gear clutches.

In any of the aspects or combinations of the aspects, the first and second clutches may be directional clutches or range clutches.

In another representation, a driveline system is provided that includes a plurality of clutches in a transmission and a driveline guard controller that includes: instructions that when executed by a processor cause the driveline guard controller to: determine positions of the plurality of clutches, wherein the positions are selected from a group that includes a closed position, a slipping position, and an open position; determine that an undesired combination of clutch positions is occurring and operate the plurality of clutches in a fault mode when the undesired combinations of clutch positions persists for a fault tolerant time and/or a speed of the vehicle exceeds a threshold value.

Note that the example control and estimation routines included herein can be used with various vehicle, powertrain, driveline, and/or transmission configurations. The control and diagnostic methods and routines disclosed herein may be stored as executable instructions in non-transitory memory and may be carried out by a vehicle system (e.g., a driveline system) that includes a controller in combination with the various sensors, actuators, and other powertrain hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the vehicle system, where the described actions are carried out by executing the instructions in a system including the various powertrain hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to battery electric vehicles, hybrid vehicles, or internal combustion engine (ICE) vehicles. Further, in hybrid and ICE vehicles, engines with V-6, I-4, I-6, V-12, opposed 4, and other configurations may be used. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein. It will be apparent to persons skilled in the relevant arts that the disclosed subject matter may be embodied in other specific forms without departing from the spirit of the subject matter. The embodiments described above are therefore to be considered in all respects as illustrative, not restrictive.

As used herein, the term "substantially" may be construed to mean plus or minus five percent of the range, unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operation of a vehicle system, comprising:
   at a diagnostic controller or processing unit independent from a driveline controller or processing unit, respectively, determining an engagement state of a first clutch in a transmission of the vehicle system, wherein the engagement state is selected from a group of three or more clutch engagement states;
   identifying an unauthorized clutch state based on the engagement state of the first clutch and a speed of the vehicle; and
   responsive to the identification of the unauthorized clutch state, operating the vehicle system in a fault state.

2. The method of claim 1, wherein the three or more clutch engagement states include an engaged state, an intermediate state occurring during a shifting transient, and a disengaged state.

3. The method of claim 2, wherein:
   the engaged state, the intermediate state, and the disengaged state each are delineated by a lower pressure threshold and a higher pressure threshold;
   the disengaged state is identified when a clutch pressure is below the lower pressure threshold;
   the engaged state is identified when the clutch pressure is above the higher pressure threshold; and
   the intermediate state is identified when the clutch pressure is above the lower pressure threshold and below the higher pressure threshold.

4. The method of claim 1, wherein the engagement state of the first clutch is determined based on a pressure applied to the first clutch and/or a drive current provided to an actuator of the first clutch.

5. The method of claim 1, wherein identifying the unauthorized clutch state includes:
   comparing the engagement state of the first clutch against an engagement state of a second clutch; and
   determining that the first clutch and the second clutch are opposite clutches in unauthorized engagement states.

6. The method of claim 5, wherein the vehicle system is operated in the fault state in response to a duration of the unauthorized clutch state exceeding a fault tolerant time.

7. The method of claim 6, wherein the fault tolerant time is variable.

8. The method of claim 6, wherein the vehicle system is operated in the fault state in response to the vehicle speed exceeding a threshold speed.

9. The method of claim 1, wherein the first clutch is a directional clutch, a gear clutch, or a range clutch.

10. A vehicle system, comprising:
    a transmission including a plurality of clutches configured to selectively engage and disengage to shift between a plurality of discrete gear ratios;
    a diagnostic controller or processing unit including:
       instructions that, when executed, cause the diagnostic controller or processing unit to:
          determine an engagement state of each of a plurality of clutches, wherein each of the engagement states are selected from a group of engagement states that include an engaged state, an intermediate state, and a disengaged state; and
          operate the vehicle system in a fault state based on a comparison of the engagement states of the plurality of clutches.

11. The vehicle system of claim 10, wherein the intermediate state is associated with a shifting transient.

12. The vehicle system of claim 10, wherein the plurality of clutches include one or more range clutches, one or more gear clutches, and one or more directional clutches.

13. The vehicle system of claim 10, wherein operating the vehicle system in the fault state includes disengaging the plurality of clutches.

14. The vehicle system of claim 10, wherein the vehicle system is operated in the fault state when a vehicle speed exceeds a threshold speed.

15. The vehicle system of claim 14, wherein the vehicle system is operated in the fault state when a duration of an unauthorized clutch state exceeds a fault tolerant time.

16. A method for operation of a driveline system, comprising:
    at a diagnostic controller independent from a driveline controller, determining a vehicle speed;
    determining an engagement state of each of a first clutch and a second clutch in a transmission based on a pressure or current associated with each of the first clutch and the second clutch, wherein the engagement state of each clutch is selected from a group of three or more clutch engagement states that includes an engaged state, an intermediate state, and a disengaged state;
    identifying an unauthorized clutch state based on a comparison between the engagement states of the first and second clutches and a set of unauthorized clutch states; and
    responsive to the identification of the unauthorized clutch state and the vehicle speed exceeding a threshold speed, operating the first clutch and the second clutch in a fault state.

17. The method of claim 16, wherein the intermediate state occurs during a shifting transient.

18. The method of claim 16, wherein the unauthorized clutch state includes an engaged or intermediate state of both of the first and second clutches.

19. The method of claim 18, wherein the first and second clutches are gear clutches.

20. The method of claim 18, wherein the first and second clutches are directional clutches or range clutches.

* * * * *